Feb. 23, 1926.  1,574,091

O. D. HORTON

APPARATUS FOR MAKING CARBON OR LAMPBLACK

Filed Dec. 30, 1922

Inventor
Oliver D. Horton

Attorney

Patented Feb. 23, 1926.

1,574,091

UNITED STATES PATENT OFFICE.

OLIVER D. HORTON, OF ERIE, PENNSYLVANIA.

APPARATUS FOR MAKING CARBON OR LAMPBLACK.

Application filed December 30, 1922. Serial No. 609,815.

*To all whom it may concern:*

Be it known that I, OLIVER D. HORTON, a citizen of the United States, residing at Erie, in the county of Erie and State of Pennsylvania, have invented new and useful Improvements in Apparatus for Making Carbon or Lampblack, of which the following is a specification.

In the making of carbon or lamp black the common method is to burn gases, ordinarily natural gas, with an imperfect combustion and deposit the carbon on plates which chill the flame, remove this carbon and then collect it. In the usual form reciprocating plates are used for depositing the carbon and mechanical conveyors are utilized for removing the carbon or lamp black as it is removed from the plates.

With the present invention the plates are arranged in an endless carrier so that through one reach of the carrier the plates are cooled, thus keeping the temperature of the plates down to a point where the carbon is readily deposited. Another feature of the invention is the collection of the lamp black or carbon as it is formed by a suction apparatus which results in a very large saving of the carbon or lamp black and also does away with the filling of the plant with carbon or lamp black dust.

Figure 1:
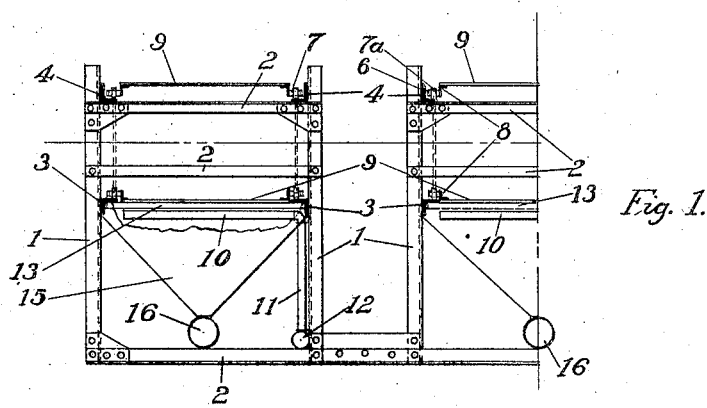

The invention is illustrated in the accompanying drawings as follows:

Fig. 1 shows an end view of a carbon or lamp black machine.

Figure 2:
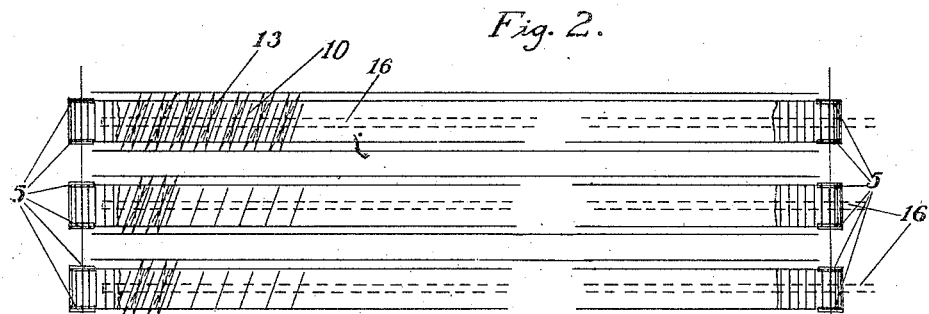

Fig. 2 a plan view of the device diagrammatically.

Figure 3:
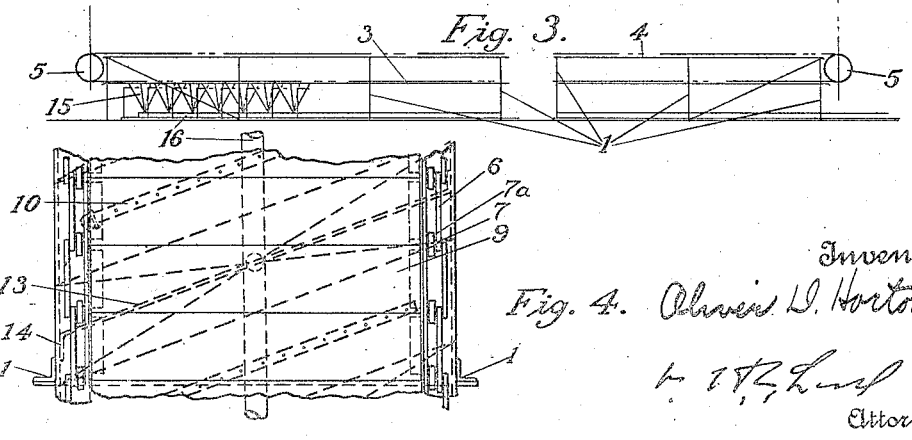

Fig. 3 a side elevation of the same.

Figure 4:
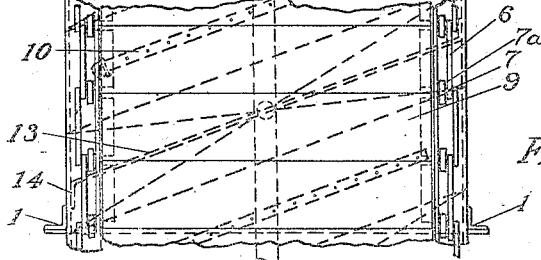

Fig. 4 a plan view of the carbon or lamp black deposit plates.

1 marks the side posts with which the frames are formed. These are connected by cross beams 2, 2, 2. Angle plates 3 extend longitudinally between the posts 1, one face of the angle plates extending downwardly and 4 a second angle plate arranged above the plate 3 and extending longitudinally of the posts. Sprocket wheels 5 are arranged at the ends of the frame and a carrier chain 6 runs over these sprockets. Pivotal pins 7 of the carrier chain extend through rollers 7ª and are secured to the deposit plates 9. The rollers travel on the angle plates 3 and 4 as clearly shown in Figs. 1 and 4 and the plates in their lower reach form practically a continuous surface. Burners 10 are arranged under the plates along the lower reach. These are connected with upright pipes 11 extending from the manifold gas pipes 12 extending along the frame. Scrapers 13 have the angled ends 14 and are secured to the angle plates 3. The scraper plates are arranged between the burners 10 and are preferably arranged at an angle to the edges of the plates 9 so as to bridge the joints between the plates 9 and thus avoid any difficulty of the scrapers catching in these joints. The burners are preferably arranged midway between the scrapers and preferably parallel to the scrapers.

Hopper-shaped receptacles are provided with their mouths directly under the plates along the lower reach of the carrier. These hoppers are also arranged on the angle, a receptacle being formed for each scraper, the scraper being mounted within the receptacle. The carbon or lamp black as it accumulates is removed from the plates as it is advanced by the scraper. An exhaust pipe 16 is connected to the bottoms of the receptacles 15 and is subjected to strong suction so as to draw air rapidly through the small clearance between the joints of the plates and between the plates and the mouths of the receptacles and this takes up the carbon or lamp black as it is removed by the scrapers and carries it to any suitable collector formed along any of the well-known plans.

In this way the objectionable dust and loss of carbon or lamp black which is common to the mechanical collection is obviated. The plates as they become warmer than is desirable for the deposit of carbon or lamp black are carried beyond the lower reach and have ample time to cool in the upper reach of the machine.

While I have indicated gas as the fuel from which this carbon or lamp black is formed I do not wish to be understood as being limited to this kind of fuel.

What I claim as new is:—

1. In a carbon or lamp black making apparatus, the combination of an endless carrier; comprising deposit surfaces; a plurality of burners directing their flame against said surfaces; and a plurality of scrapers, one scraper between each burner operating on the surfaces.

2. In a carbon or lamp black making apparatus, the combination of an endless carrier; deposit plates carried by the carrier; a plurality of burners directing their flame against said plates; and a plurality of scrapers, one scraper between each burner operating on the plates, said scrapers being arranged at an angle to the edges of the plates.

3. In a carbon or lamp black making apparatus, the combination of an endless carrier; comprising deposit surfaces; a burner directing its flame on said surfaces; a scraper acting on the surfaces; a receptacle over the mouth of which the surfaces move; and a pneumatic exhauster pipe leading from the receptacle.

4. In a carbon or lamp black making apparatus, the combination of an endless carrier; a plurality of burners directing their flame against said surfaces; a plurality of scrapers, one scraper between each burner operating on the surfaces; a receptacle enclosing each scraper; and means pneumatically exhausting said receptacles.

5. In a carbon or lamp black making apparatus, the combination of a frame formed with a series of posts; angle plates extending lengthwise of the frame and forming tracks; an endless carrier having wheels carried by said tracks; deposit plates mounted on said carrier; a scraper acting on said plates; and a burner directing its flame on said plates.

In testimony whereof I have hereunto set my hand.

OLIVER D. HORTON.